United States Patent Office 3,390,386
Patented June 25, 1968

3,390,386
SPAN TRIMMING ADJUSTMENT AND TEMPERATURE COMPENSATION FOR A TRANSMITTER OF THE FORCE BALANCE TYPE
Edward J. Cranch, Bryn Athyn, and Richard M. Hickox, Glenside, Pa., assignors to Leeds & Northrup Company, a corporation of Pennsylvania
Filed Feb. 23, 1965, Ser. No. 434,567
10 Claims. (Cl. 340—187)

ABSTRACT OF THE DISCLOSURE

Apparatus providing for fine range or span trimming adjustment of a transmitter of the force balance type by modifying the iron structure around the air gap so that the air gap is adjustable in length thus changing the flux density of the field around the feedback coil of the transmitter.

---

This invention relates to the low pressure, differential pressure of flow transmitters of the force balance type and has for an object an improved system for a span trimming adjustment and for temperature compensation of the feedback magnet.

In transmitters of the force balance type, the force on a diaphragm, connected to one end of a pivoted beam, is balanced against the magnetic force on a coil, mounted at one end of a second pivoted beam. The coil carries the output current through the magnetic field in the air gap of a stationary magnet. The two pivoted beams are connected by a flexible link. Clamping the ends of the link at various positions along the two beams provided a coarse span adjustment by varying the ratio of the lever arms on the two beams. To provide a span trimming adjustment which can be changed without disturbing the beam system, the force on the coil at full output should be adjustable by about five percent. Span trimming adjustment has been provided heretofore by means of an adjustable resistance shunting the coil. Since the current through the coil was determined by the force balance requirements, the output current to the external load could be varied by adjusting the added current coming through the adjustable shunt. Such arrangement required a precise match between the temperature coefficients and the temperatures of the coil and the shunt, which was difficult to accomplish since the coil was mounted on a moving lever.

The foregoing difficulty has been overcome in accordance with the present invention by modifying the iron structure around the air gap so that the air gap is adjustable in length and, thus changing the flux density of the field around the coil. Lengthening the air gap weakens the field and requires the transmitter to send more output current through the coil in order to balance the force on the diaphragm. This applies both to a differential pressure transmitter, using a permanent magnet, and to a flow transmitter using an electromagnet.

In accordance with the present invention, there is provided in a transmitter of the force balance type, in which a feedback force is obtained from a current-conducting coil in a magnetic field, the improvement of means for span trimming adjustment by adjusting the flux density of the magnetic field. Such means comprises a magnet frame, a pole piece carried by the magnet frame and including means for producing a magnetic field, a magnetic structure carried by the frame in spaced relation with the pole piece and forming a magnetic air gap, and adjustable means connected to the magnetic structure and effective thereon to change the length of the magnetic air gap.

In accordance with a further aspect of the invention the magnetic structure comprises a pair of sections at least one of which is adjustable relative to the other by the adjustable means to change the length of the magnetic air gap.

In accordance with another aspect of the invention, the adjustable means comprises a member connected to an adjustable one of the pair of sections and to fixed structure. The member has a temperature coefficient of expansion greater than that of the magnetic structure for moving one of the pair of sections upon rise of ambient temperature to reduce the magnetic air gap keeping the flux constant with temperature.

In accordance with a further aspect of the invention, both of the sections of the magnetic structure are pivotally carried by the magnet frame and the adjustable means comprises first means connected to one of the sections and second means connected to the other section and adjustable independently of each other to change the length of the magnetic air gap. The first adjustable means is adjustable manually and the second adjustable means is adjustable automatically with temperature.

For further objects and advantages of the invention and for a more detailed description thereof, reference is to be had to the following specification taken in conjunction with the accompanying drawings in which:

FIG. 1a is a perspective view of the arrangement for transmitting torque through a pressure seal on an externally supported shaft as utilized in FIG. 1;

Figure 1:
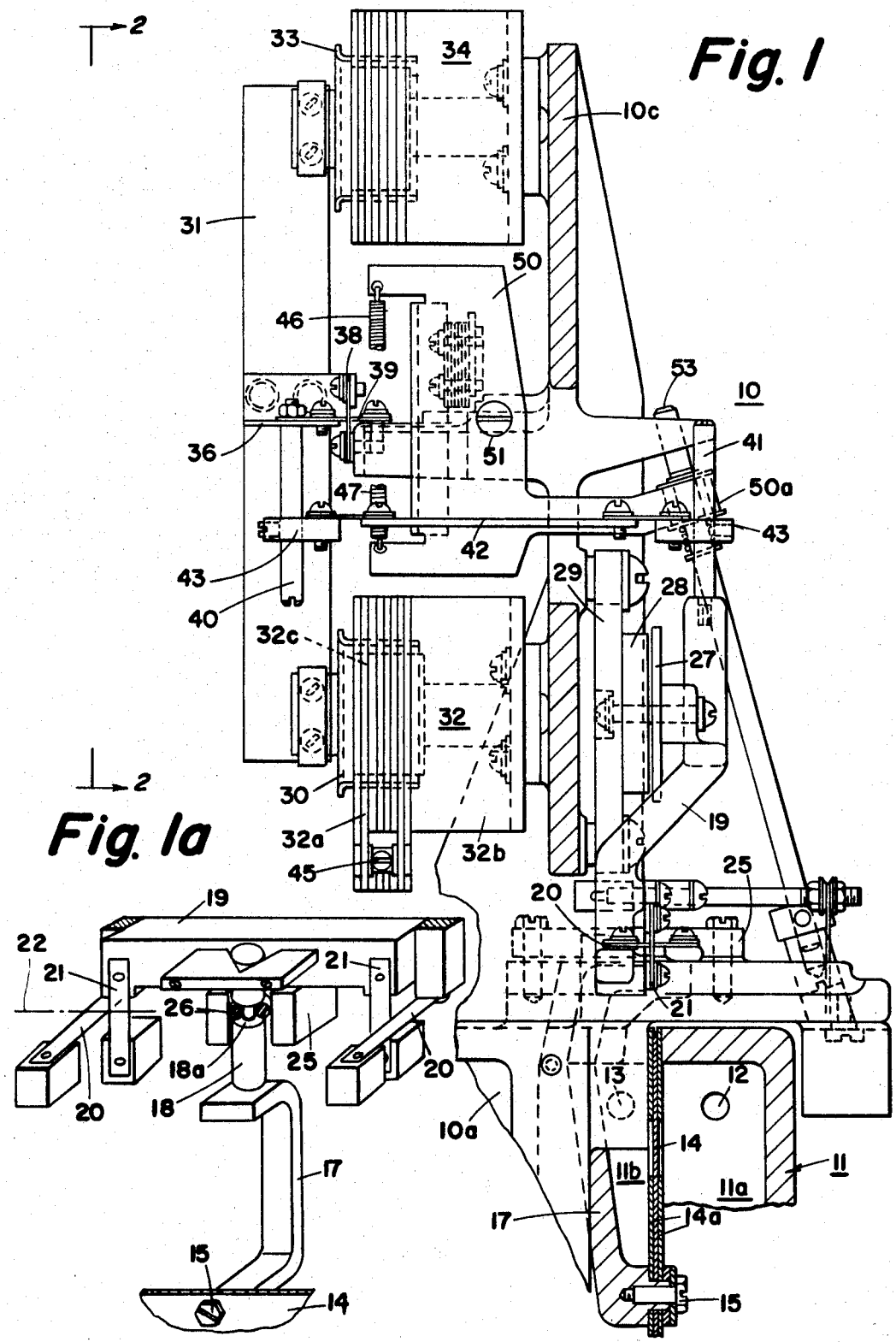
FIG. 1 is a schematic view partly in section of a transmitter of the force balance type embodying the present invention.

Referring to FIG. 1, the invention has been illustrated in connection with a differential pressure transmitter of the force balance type which is adapted to convert a differential pressure to an electric current. The force balance transmitter 10 includes a differential pressure cell or housing 11 which has a pair of inlet ports 12 and 13 to which high and low pressure connections are made. The inlet ports 13 and 12 are supplied with pressure from the low pressure and high pressure sides, for example, of an orifice plate in a flow line. It will be noted that the inlet ports 12 and 13 are disposed on opposite sides of a flexible diaphragm 14, the edges of which are clamped between mating parts of the housing 11. The center portion of the flexible diaphragm 14 is provided, on both of its surfaces, with rigid plate members 14a through which extend a clamp screw 15. The flexible diaphragm 14 divides the housing 11 into two separate chambers 11a and 11b with the flexible diaphragm 14 providing a common wall between the two chambers 11a and 11b.

The diaphragm 14 is connected, by clamp screw 15, to one end of an arm 17 and the other end of arm 17 is secured to one end of a shaft 18, FIG. 1a. The shaft 18 extends out of the interior of housing 11 and has its opposite end secured to a beam member 19. As may be seen in FIGS. 1 and 1a, the beam member 19 is connected to a pair of flat pivot spring members 20 disposed on opposite sides of the shaft 18 and a pair of vertical flat pivot spring members 21, also disposed on opposite sides of the shaft 18. The cooperating pairs of flat pivot springs 20 and 21 cross each other at right angles thereto and their center lines, through their points of intersection, lie on a common center line which defines a common pivotal axis 22. The opposite ends of the flat pivot spring 20 and 21 are secured to stationary parts of the frame for the transmitter 10. Thus, it will be seen that the beam member 19 and the arm 17 are rigidly secured to each other by means of the intermediate shaft 18 and all three members 17–19 constitute a lever which is adapted to pivot about the pivotal axis 22.

As previously mentioned, the shaft 18 extends out of the housing 11. In order to maintain the pressure within the diaphragm chamber 11b, a sealing block or plate 25 is secured to the housing 11 and over the opening therein through which the shaft 18 extends. The shaft 18 extends through an opening in the sealing plate 25. The shaft 18 is provided with an annular sealing ring 26 of the O-ring type, or equivalent, which may be made of an elastomer material including rubber or other suitable equivalent plastic material such as nylon, fluorocarbon resin and the like. The O-ring 26 forms a seal on its inner circumference with the shaft 18 and on its outer circumference with the opening through the sealing plate 25. As may be seen in FIG. 1a, the shaft 18 is provided with an annular groove 18a which receives the annular sealing O-ring 26. The groove 18a is so positioned as to maintain the center of O-ring 26 on the common center line or axis 22 of the pivots 20 and 21.

The beam 19 is provided with a movable capacitor plate 27 which is adapted to cooperate with a stationary capacitor plate 28 supported from one side of insulator member 29. The capacitor plate 27 is moved relative to the stationary capacitor plate 28 in response to changes in the differential pressure applied to the opposite sides of the diaphragm 14. The change in the spacing between the capacitor plates 27 and 28 produces a change in capacitance in an oscillator circuit (not shown) located within the housing portion 10a, FIG. 1. The details of the electrical circuit do not form part of the present invention and, thus, are not specifically disclosed. However, the electrical circuit may be similar to the oscillator-amplifier circuit disclosed in United States Patent 2,957,115, Clark et al., with the exception that the present circuit incorporates a variable capacitor comprising plates 27 and 28 rather than a variable inductor.

The D.C. output from the amplifier contained in the housing portion 10a is fed by way of electrical conductors (not shown) to a feedback coil 30 which is suspended at one end of a pivoted beam 31 in the magnetic field in the air gap of a stationary magnet 32 supported on frame member 10c. Since the output current flowing in coil 30 is flowing in the field of magnet 32, it is acted upon by a motor force proportional to the current which tends to force the coil 30 out of the gap of stationary magnet 32.

Figure 2:
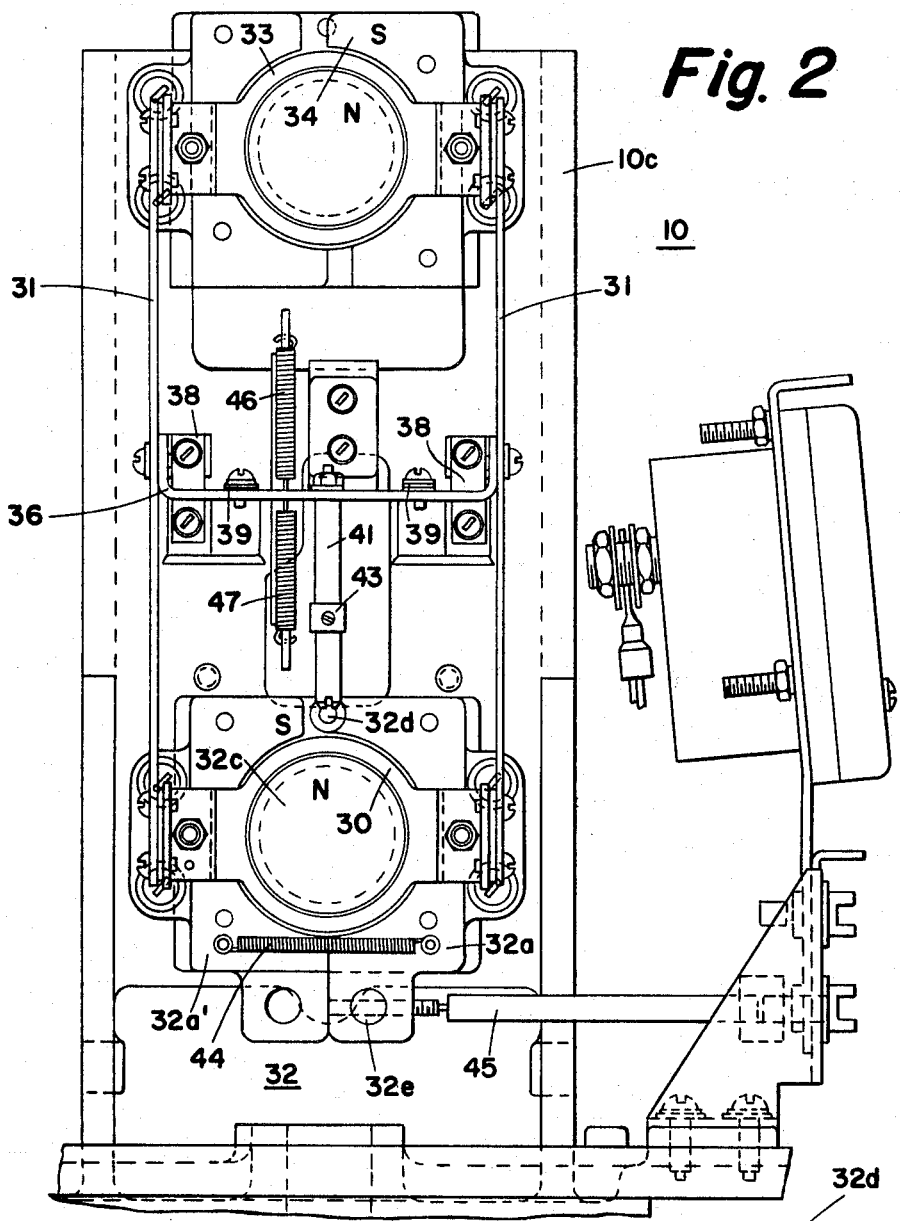
FIG. 2 is a side elevational view looking in the direction of arrows 2—2 in FIG. 1 and showing the magnetic air gap adjustment in closed position.

As may be seen in FIG. 1, the stationary magnet 32 comprises a magnet frame 32b which supports a pole piece 32c including a permanent magnet. The magnet frame 32b also supports magnetic structure 32a and 32a' in spaced relation with the pole piece 32c forming a magnetic air gap into which the feedback coil 30 extends. The magnetic structure 32a', FIG. 2, is fixed to the magnet frame 32b while the magnetic structure 32a is connected to the magnet frame 32b by means of a pivot 32d. Thus, it will be seen that the magnetic structure comprises a pair of sections 32a and 32a' one of which is adjustable relative to the other. The sections 32a and 32a' of the magnetic structure are each made up of a plurality of layers of iron plates having semicircular surfaces on the inner edges thereof which are adapted to be spaced from the circumference of pole 32c and cooperate therewith to produce a circular magnetic air gap. As may be seen in FIG. 2, the section 32a is provided with an extension which is adapted to support a threaded female insert 32e which, in turn, is adapted to receive the threaded end of a threaded rod or screw member 45. The outer end of the screw member 45 is adapted to be accessible from the exterior of the housing or casing for the transmitter 10 for manual adjustment. The purpose of this adjustment will hereinafter be described.

The opposite end of the beam 31 is provided with a damping coil 33 which is suspended in the field of a permanent magnet 34, also supported by the frame member 10c. The beam 31 comprises a pair of spaced members which are connected, intermediate their ends, by means of a U-shaped bracket 36. The bracket 36 is supported from the frame 10c by two pairs of spaced crossed, flat pivot springs 38 and 39 which are similar to the pivot springs 20 and 21 previously described. Thus, the crossed pivot springs 38 and 39 provide a flexible pivot bearing for the beam 31. Depending from the mid-portion of the U-shaped member 36 is a stud 40 which is similar to the stud 41 extending from the end of the beam 19. The studs 40 and 41 are connected, by means of a flexible link 42 which transmits the torque produced by the motor force on coil 30 from beam 31 to beam 19 and restores the movable capacitor plate 27 on beam 19 substantially to its original position. The link 42 is provided, at its opposite ends, with connectors 43, respectively adjustable along the studs 40 and 41 to provide a rough or coarse range or span adjustment by varying the ratio of the lever arms on the two beams 19 and 31.

Figure 2A:
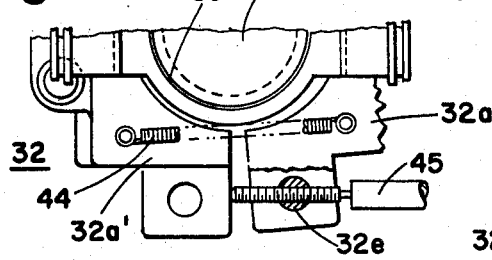
FIG. 2a is a fractional view of the stationary magnet assembly of FIG. 2 showing the magnetic structure adjusted to lengthen the air gap.

The fine range or span adjustment is accomplished by adjusting the magnetic air gap relative to the feedback coil 30 by means of the screw member 45 associated with the magnetic structure section 32a as shown in FIGS. 1, 2 and 2a. Lengthening the air gap weakens the field and requires the transmitter to send more output current through the feedback coil 30 in order to balance the force on the diaphragm. By hinging the magnetic structure section 32a on pivot 32d, so that it can be rotated away from the other section 32a', as shown in FIG. 2a, this enables a rather large portion of the complete circular magnetic air gap to be lengthened. The threaded rod 45, with one end pushing on the fixed half of 32a' of the magnetic structure, forces the hinged half 32a away as the rod is rotated using a screw driver slot at the opposite end of the rod. As pointed out above, to provide a span trimming adjustment which can be changed without disturbing the beam system, the force on the feedback coil 30 a a full output, for example, about 40 milliamperes, should be adjustable by about five percent. In the arrangement illustrated in FIGS. 1, 2 and 2a, about one quarter inch motion of the insert 32e changes the air gap sufficiently to produce the required five percent change in output current. A tension spring 44, having its opposite ends secured to the adjacent extension of the respective sections 32a and 32a', is effective to close the air gap again as the threaded rod 45 is rotated in the closing direction.

Figure 3:
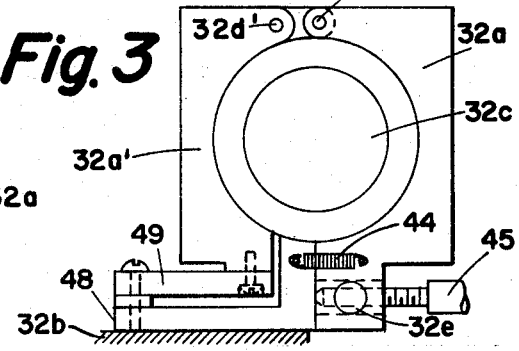
FIG. 3 is a modification of the magnet assembly including provision for temperature compensation.

As pointed out above, the invention has been illustrated in connection with a differential pressure transmitter and, thus, the pole piece 32c is of the permanent magnet type and may be made from such permanent magnet material as Alnico V. The strength of an Alnico V permanent magnet grows less as its ambient temperature rises. Such weakening of the magnet reduces the flux density in the magnetic air gap. The modification shown in FIG. 3 includes a provision for automatically compensating for the decrease in magnet strength due to ambient temperature rises. As may be seen in FIG. 3, both halves or sections 32a and 32a' have been hinged, thus, permitting the section 32a to be used as a span trimmer with the threaded rod 45 pushing on a fixed stop 48 fixed to the magnet frame 32b of the transmitter 10. The other section 32a', which is pivoted at 32d', provides temperature compensation for the permanent magnet pole piece 32c. A plastic bar 49 of suitable length and predetermined temperature coefficient of expansion is connected between the fixed member 48 and the movable magnetic structure section 32a', FIG. 3. It is desired that the plastic bar 49 be capable of expanding about 1/32 inch for a 100° F. rise in temperature. Plastic materials having thermal properties such that the coefficient of linear expansion per degree F. is within the range of about $4.5 \times 10^{-5}$ to $10 \times 10^{-5}$ would be suitable. Acetal resins (Delrin), nylon resins and fluorocarbon resins (Teflon) or equivalents are examples of suitable plastic materials. As the ambient temperature rises, the plastic member 49 expands, moving the section 32a' about its pivot 32d' and toward the pole piece 32c to reduce the air gap and compensate for the weaker pole piece magnet, thus, keeping the flux constant with temperature.

The beam 31 is urged to a zero position by means of a pair of coil springs 46 and 47 which are connected, at one end, to a member extending from the bracket 36 carried by the beam 31 and, at their opposite ends, to a bracket 50 carried by a pivot 51 extending into the frame 10c. The bracket 50 is provided with an arm 50a which is adapted to be connected to an adjustable shaft 53, the lower end of which is accessible from the exterior of the housing for the transmitter 10. By rotating the shaft 53, which is threaded, the bracket 50 may be rotated about its pivot 51 causing the springs 46 and 47 to vary the force applied to the connection to the beam 31 thereby adjusting the zero position of the capacitor plate 27 by moving beam 19 by means of link 42. The plate 27 is in the zero position when the output current is zero.

As will be understood by those skilled in the art, a force balance system of this type always requires a very small amount of offset in order to provide the feedback current to adjust the force balance. However, due to the high degree of amplification, the resultant displacement between the capacitor plates 27 and 28 is very small. In order to avoid a dead band in the transmitter, it is exceedingly important that the friction on the beam 31 be held to the absolute minimum. It is also important that the pivot structure and seal at the pivotal axis for the beam 19 be of such construction so as not to produce an error torque of any substantial amount. In prior arrangements, the working pressure was contained in the diaphragm housing by a metal sealing diaphragm. The area of such diaphragm limited the allowable working pressure to a relatively low value, for example, in the order of 50 p.s.i., and the mismatch of its effective center and the center of the beam, multiplied by the working pressure, multiplied by the area of the diaphragm gave a large error torque in the instrument.

To overcome the limitations of the metal sealing diaphragm, the seal area in the present system has been reduced to a minimum by using the annular rubber O-ring 26 or equivalent, FIG. 1a, for the seal. The support for the beam 19, against forces which would otherwise compress the annular rubber O-ring 26, is provided by the cross spring pivots 20 and 21 located on the same center line as the annular rubber O-ring 26. The seal is rated to withstand relatively high pressures in the order of 1,500 p.s.i., but other portions of the pressure housing 11, of course, require operation at much lower working pressures. Since the beam 19 of the force balance transmitter moves through very small angles, in the order of about ten minutes of an angle maximum, and since the O-ring 26 is at the center of rotation, the O-ring 26 does not slip and contribute a friction error and the amount of strain of the ring is so small that hysteresis is negligible. In a force balance transmitter constructed in accordance with the present disclosure, the maximum hysteresis was about .14 percent.

The torque transmission with improved shaft seal, as described above, is claimed in copending application, Ser. No. 434,566, filed concurrently herewith by Hickox, now U.S. Patent 3,315,528, issued Apr. 25, 1967.

While the novel magnetic air gap adjustment has been described in connection with a force balance differential pressure transmitter in which the feedback force is obtained from a current-conducting coil in a permanent magnet field, it is to be understood that the invention is also applicable to a force balance flow transmitter utilizing an electro-magnet in which the magnetic field is provided by the current in a field coil on the pole piece 32c in place of the permanent magnet. Such a force balance flow transmitter is disclosed in copending application, Ser. No. 434,457, filed concurrently herewith by Cranch and Stanwood.

It shall be understood that this invention is not limited to the specific arrangements shown and that changes and modifications may be made within the scope of the appended claims.

What is claimed is:

1. A transmitter of the force balance type in which a feedback force is obtained from a current-conducting coil in a magnetic field, including the improvement of means for span trimming adjustment by adjusting the flux density of the magnetic field comprising:
   a magnet frame,
   a pole piece carried by said frame,
   magnetic structure carried by said frame in surrounding spaced relation with said pole piece forming a circular magnetic air gap, and
   adjustable means connected to said magnetic structure and effective thereon to change the length of said magnetic air gap.

2. In a transmitter of the force balance type according to claim 1 wherein said magnetic structure comprises a pair of sections at least one of which is adjustable relative to the other by said adjustable means to change the length of said magnetic air gap.

3. In a transmitter of the force balance type according to claim 1 wherein said adjustable means comprises a threaded rod threadedly connected to said magnetic structure and adjustable relative to said pole piece.

4. In a transmitter of the force balance type according to claim 2 wherein said adjustable means comprises a member connected to an adjustable one of said pair of sections and to fixed structure, said member having a temperature coefficient of expansion greater than that of said magnetic structure for moving said one of said pair of sections upon rise of ambient temperature to reduce the magnetic air gap so as to maintain the flux density of the magnetic field constant with temperature.

5. In a transmitter of the force balance type according to claim 2 wherein one of said sections is pivotally carried by said frame, and said adjustable means is effective to rotate said pivotally carried sections relative to said pole to change the length of said magnetic air gap.

6. In a transmitter of the force balance type according to claim 5 wherein said adjustable means comprises:
   a rotatable member threadedly engaging said pivotally carried section, and
   tension means connected to said pivotally carried section to assist said rotatable member in shortening said magnetic air gap.

7. In a transmitter of the force balance type according to claim 2 wherein both of said pair of sections are pivotally carried by said frame, and said adjustable means comprises first and second means connected respectively to one of said sections and adjustable independently of each other to change the length of said magnetic air gap.

8. In a transmitter of the force balance type according to claim 7 wherein said first adjustable means is adjustable manually and said second adjustable means has a predetermined temperature coefficient of expansion and is adjustable automatically with temperature.

9. In a transmitter of the force balance type according to claim 1 wherein said pole piece includes a permanent magnet for producing a magnetic field.

10. A transmitter of the force balance type according to claim 1 comprising:
   a first pivoted beam pivotally suported intermediate the ends thereof.
   diaphragm means connected to one end of said first pivoted beam to receive an input signal force,
   a second pivoted beam pivotally supported intermediate the ends thereof at a location adjacent said first pivoted beam,
a feedback coil carried by one end of said second pivoted beam and positioned in said magnetic air gap,
a flexible link connecting both of said pivoted beams,
electrical circuit means including impedance means carried by said first pivoted beam and adjustable therewith so that the input signal force on said diaphragm means connected to said one end of said first pivoted beam is balanced against the magnetic force on said feedback coil carried by said one end of said second pivoted beam, said feedback coil carrying the output current of the transmitter through the magnetic field in said magnetic air gap, and
means for adjusting said flexible link at various positions along the two said pivoted beams to provide a coarse span adjustment by varying the ratio of the lever arms on the two said pivot beams.

References Cited

UNITED STATES PATENTS

| | | | |
|---|---|---|---|
| 3,070,765 | 12/1962 | Johansson | 336—134 XR |
| 3,080,513 | 3/1963 | Edwards | 340—187 XR |
| 3,250,961 | 5/1966 | Parker | 335—217 |

BERNARD A. GILHEANY, *Primary Examiner.*

THOMAS B. HABECKER, *Examiner.*

GEORGE HARRIS, *Assistant Examiner.*